United States Patent
Zirkel (10) Patent No.: US 12,517,337 B2
(45) Date of Patent: Jan. 6, 2026

(54) PANEL INSPECTION DEVICE HAVING FIRST, SECOND AND THIRD MIRRORS, AND METHOD FOR INSPECTING A PANEL

(71) Applicant: Qioptiq Photonics GmbH & Co. KG, Goettingen (DE)

(72) Inventor: Achim Zirkel, Goettingen (DE)

(73) Assignee: Excelitas Deutschland GmbH, Feldkirchen (DE)

( * ) Notice: Subject to any disclaimer, the term of this patent is extended or adjusted under 35 U.S.C. 154(b) by 109 days.

(21) Appl. No.: 18/473,928

(22) Filed: Sep. 25, 2023

(65) Prior Publication Data

US 2024/0011920 A1     Jan. 11, 2024

Related U.S. Application Data

(63) Continuation of application No. PCT/US2021/024880, filed on Mar. 30, 2021.

(51) Int. Cl.
*G02B 17/06* (2006.01)
*G01N 21/95* (2006.01)

(52) U.S. Cl.
CPC ......... *G02B 17/0626* (2013.01); *G01N 21/95* (2013.01); *G02B 17/0642* (2013.01); *G02B 17/0684* (2013.01); *G01N 2201/0636* (2013.01)

(58) Field of Classification Search
CPC ........... G01N 21/95; G01N 2201/0636; G01N 2201/1053; G01N 21/8806;
(Continued)

(56) References Cited

U.S. PATENT DOCUMENTS 3,748,015 A * 7/1973 Offner ................ G02B 17/0615
359/731
6,373,917 B1 * 4/2002 Roder .................. G01N 23/044
378/22
(Continued)

FOREIGN PATENT DOCUMENTS

CN     107621691 A     1/2018
EP     1 367 425 B1    12/2003
(Continued)

OTHER PUBLICATIONS

International Search Report and Written Opinion for International Application No. PCT/US2021/024880 mailed Jan. 7, 2022.
(Continued)

*Primary Examiner* — Jennifer D Bennett
(74) *Attorney, Agent, or Firm* — Wolf, Greenfield & Sacks, P.C.

(57) ABSTRACT

An inspection device for inspecting a panel, in particular a display, or a PCB, includes a first mirror, a second mirror, a third mirror, and a sensor. The first mirror, the second mirror, and the third mirror are arranged to display a section of the panel to be inspected on the sensor with a magnification factor greater than one. At least two of the group of the first mirror, the second mirror, and the third mirror, have both a first type of curvature, and a remaining mirror has a second type of curvature, opposite to the first type of curvature. The first mirror, the second mirror, and the third mirror form a telecentric system which is telecentric on a panel facing side and/or on a sensor facing side.

16 Claims, 8 Drawing Sheets

(58) Field of Classification Search
CPC ....... G01N 21/8851; G01N 2021/9513; G01N 2021/95637; G02B 17/0626; G02B 17/0642; G02B 17/0684
See application file for complete search history.

(56) References Cited

U.S. PATENT DOCUMENTS

| | | | |
|---|---|---|---|
| 2002/0186368 A1* | 12/2002 | Rosengaus | G01N 21/9501 356/237.2 |
| 2012/0249985 A1* | 10/2012 | Wischmeier | G01M 11/0264 356/124 |
| 2013/0063716 A1* | 3/2013 | Mann | G02B 19/0047 356/51 |
| 2015/0192459 A1* | 7/2015 | Kvamme | G03F 7/70233 250/372 |
| 2017/0219807 A1 | 8/2017 | Zhang | |
| 2018/0180898 A1 | 6/2018 | Zhu et al. | |

FOREIGN PATENT DOCUMENTS

| | | | | |
|---|---|---|---|---|
| JP | 2008089832 A | * | 4/2008 | |
| WO | WO-2006069725 A1 | * | 7/2006 | ........... G02B 13/143 |
| WO | WO 2016/147071 A1 | | 9/2016 | |
| WO | WO 2021/054845 A1 | | 3/2021 | |

OTHER PUBLICATIONS

International Preliminary Report on Patentability for International Application No. PCT/US2021/024880 mailed Oct. 12, 2023.

* cited by examiner

Provide a sensor, a first mirror, a second mirror, a third mirror, where two of the mirrors have a first type of curvature, and a remaining mirror has a second type of curvature opposite of the first type of curvature.
710

Arrange the first, second, and third mirrors to convey a section of the panel under inspection upon the sensor with a magnification factor greater than one
720

Capture an image of the section of the panel by the sensor
730

Display a section of the panel with a magnification factor M greater than one.
740

PANEL INSPECTION DEVICE HAVING FIRST, SECOND AND THIRD MIRRORS, AND METHOD FOR INSPECTING A PANEL

CROSS-REFERENCE TO RELATED APPLICATIONS

This application claims priority under 35 U.S.C. § 120 to and is a continuation of International Application No. PCT/US2021/024880, filed Mar. 30, 2021, titled "PANEL INSPECTION DEVICE AND METHOD FOR INSPECTING A PANEL," which is incorporated by reference herein in its entirety.

FIELD OF THE INVENTION

The invention relates optical devices, and in particular to a method and device for inspecting a machine vision panel.

BACKGROUND OF THE INVENTION

In machine vision applications, the inspection of OLED displays (e.g., mobile phone displays, or flat panel displays in general) demands a resolution limited optical system. If very small defects in the object need to be detected, the magnification of those systems considerably exceeds magnification 1× which means that the defect size is smaller than the pixel size of the sensor. As with a magnification larger than 1× the object is smaller than the image, in general only one part at a time of the panel is inspected. Preferably, the sensor is as large as possible to speed up the inspection process. The sensor can be a surface (area) sensor or a line sensor. The latter has the shape of a line and can be as long as 82 mm and is used in applications which continuously scan the object.

In many cases a broad spectrum is needed, or different colors are used to inspect different features of the panel. In an industrial environment it is common that the inspection has to be performed fast (inline inspection), this means no refocusing between colors is allowed. This implies a thorough control of the axial color aberration of the optical system, even or particularly after production tolerances. As the magnification M of the system increases, the axial color becomes the more prominent.

Additionally, the lateral color aberration is very small as well, at least smaller than the pixel size of the sensor used. This ensures that the same location in the object viewed in different colors falls onto the same pixel of the sensor.

Another important feature is that the object inspected is not exactly flat, but in general can have a third dimension. In order to precisely locate any defect also in the z-dimension, a telecentric lens is needed. In this special type of lenses, the magnification is virtually independent of the object distance (in double telecentric systems strictly independent) and hence no parallax effects do occur. The lens has to be telecentric at least on the object side, but for some applications, the image side needs to be telecentric as well.

Machine vision applications directed to control of chromatic aberrations generally make use of conventional glass lenses. These lenses may typically include ten or more lens elements to correct for the chromatic aberrations described above and to achieve a desired level of resolution limited quality for the machine vision inspection.

Conventional optics made of glass lenses may show small chromatic aberrations in the optical design, but these aberrations may become much larger in real systems and are usually controlled by a special selection of the refractive index and the Abbe number of the glasses used. If no glass melts close to the nominal values can be found, a "melt fit" procedure implies a correction of air gaps between the lens elements, and/or radii of curvature. The melt fit procedure may lead to designs depending on specific glass melts, resulting in significant logistic challenges.

In specific (but common) cases of double telecentric lenses, an additional problem may be encountered. In a double telecentric lens, the lateral color is very difficult to control even when using very small production tolerances. A slight deviation from the nominal magnification can result in a large lateral color aberration.

Therefore, there is a need in the industry to address one or more of the abovementioned shortcomings.

SUMMARY OF THE INVENTION

Embodiments of the present invention provide a panel inspection device and method for inspecting a panel. Briefly described, the present invention relates to an inspection device for inspecting a panel, in particular a display, or a PCB. The device includes a first mirror, a second mirror, a third mirror, and a sensor. The first mirror, the second mirror, and the third mirror are arranged to display a section of the panel to be inspected on the sensor with a magnification factor M greater than one. At least two of the group of the first mirror, the second mirror, and the third mirror, have both a first type of curvature, and a remaining mirror has a second type of curvature, opposite to the first type of curvature.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

DETAILED DESCRIPTION

The following definitions are useful for interpreting terms applied to features of the embodiments disclosed herein, and are meant only to define elements within the disclosure.

As used within this disclosure, "inspection device" may refer to a piece of equipment or a mechanism designed to serve checking or testing of a specific object. The object may be a panel. The term panel may refer to a thin, and usually rectangular board. In particular, the panel may be a display, a PCB, or any other flat board which may require to be checked with a machine vision application. The features or structures to be detected on the panel may be as small as a few µm or even smaller.

The term "mirror" may refer to a polished or smooth surface (as of glass) that forms images by reflection.

The term "sensor" may refer to a device that responds to a physical stimulus, in this case light, and transmits a resulting impulse, in this case, electronic signals. Here, the sensor may transmit an electronic impulse for measurement of the panel. Depending on its dimensions, the sensor may be called a "surface sensor" when having the shape of an area, or may be called a "line sensor" when having the shape of a line, which may be a pixel line.

As used within this disclosure, "machine vision" refers to the technology and methods used to provide imaging-based automatic inspection and analysis for such applications as automatic inspection, process control, and robot guidance, usually in industry.

As used within this disclosure, the expression "to display a section of the panel to be inspected on the sensor with a magnification factor M greater than one" may refer to an enlarged representation of a part or section of the panel on the sensor. The enlarged representation, or section of the panel, may correspond to the sensor. If the sensor is a surface sensor the shape of the section of the panel may be an area in XY-plane. If the sensor is a line sensor the shape of the section of the panel being displayed may be a line, or a pixel line.

As used within this disclosure, the term "curvature" may refer to a measure or amount of curving. A curved surface, or a curved mirror in this case may reflect an image of the section of the panel on the sensor either enlarged or reduced in size. There may be two types of curvature: convex and concave. For example, in the embodiments described below two mirrors may be concave or convex wherein the third mirror may have the opposite type of curvatures being convex or concave, respectively.

As used within this disclosure, the expression "concave curvature" may refer to an object being hollowed or rounded inward like the inside of a bowl. The expression "convex curvature" may refer to an object being curved or rounded outward like the exterior of a sphere. As an example, the first mirror, and the third mirror may be concave and the second mirror may be convex.

As used within this disclosure, the term "spherical" may refer to a globular body describing an object that is bounded by a surface consisting of all points at a given distance from a point constituting its center. For example, for the inspection device according to an exemplary embodiment, at least one of the group of the first mirror, the second mirror, and the third mirror, may be spherical.

As used within this disclosure, the term "aspherical" may refer to a form departing slightly from the spherical form, especially in order to correct spherical aberration.

As used within this disclosure, the expression "symmetric" may refer to having, involving, or exhibiting symmetry. In particular, each of the mirrors may be symmetric to a central point (or vertex). The term "aperture" may here refer to a limitation of a mirror so that only a defined area of the mirror reflects the light.

As used within this disclosure, the "system stop" defines the numerical aperture of the system. According to an exemplary embodiment of the inspection device a system stop is located directly on or close to the second mirror.

As used within this disclosure, the term "telecentric" may refer to an objective or imaging system by which the image magnification is independent of the object's distance or position in the field of view. Telecentric lenses produce an orthographic view of the object, which is desired in many machine vision applications.

As used within this disclosure, the expression "planar folded mirror" may refer to an optical system having mirrors arranged to bend the beam to change the common optical path to reduce the size of the system.

Figure 1:
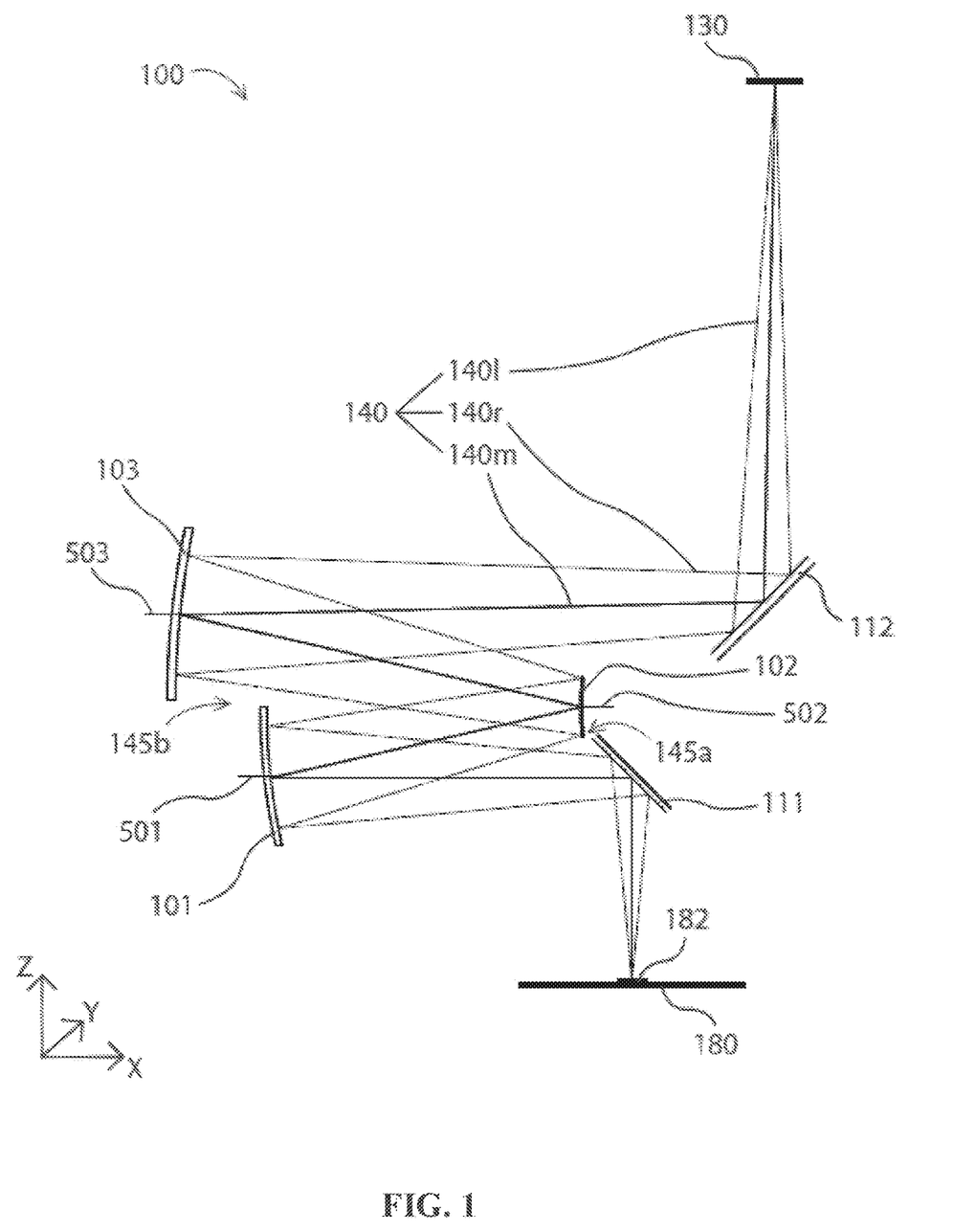
FIG. 1 is a schematic diagram of a 2D view of a first exemplary inspection device including planar fold mirrors at magnification 2×.

Reference will now be made in detail to embodiments of the present invention, examples of which are illustrated in the accompanying drawings. Wherever possible, the same reference numbers are used in the drawings and the description to refer to the same or like parts. Exemplary embodiments of the present invention described herein address specific machine vision applications where a strict control of chromatic aberrations is essential. As shown in FIG. 1, the exemplary embodiments of an inspection device for inspecting a flat object ("panel") 180 include a first mirror 101, a second mirror 102, a third mirror 103, and a sensor 130. The first mirror 101, the second mirror 102, and the third mirror 103 are arranged to display a section 182 of the panel 180 to be inspected on the sensor 130 with a magnification factor M>1. At least two of the first mirror 101, the second mirror 102, and the third mirror 103, both have a first type of curvature, and a remaining mirror has a second type of curvature, opposite to the first type of curvature. For example, the first type of curvature may concave, and the second type of curvature may be convex.

The exemplary embodiments produce a diffraction limited image of the panel 180 in machine vision applications. The panel 180, is inspected with high resolution. A broad wavelength spectrum may be applicable to inspect different features of the object. By using only mirrors longitudinal and transverse colour defects are avoided. Based on a so called "Offner approach" or "Offner system" (see U.S. Pat. No. 3,748,015, entitled "Unit Power Imaging Catoptric Anastigmat"), aberrations may be reduced or disappear, and a magnification range may be extended as well by using an additional third mirror 103. The aberrations may be formally deduced from the so-called Seidel formalism. Using a special arrangement of the three mirrors, almost any of the Seidel aberrations can be made zero or may remain very small. Higher aberrations may be corrected by appropriate aspherization of the mirrors. In particular, the Petzval sum can be kept close to zero by choosing appropriate radii of the mirrors.

In order to inspect the larger areas of the object simultaneously, line sensors may be used which may be, for example, up to 82 mm long, or longer. For example, the line sensor may have a length of 57 mm with 16 K pixels and a 3.5 µm pixel size. The panel 180 to be inspected may be moved perpendicular to a line axis of the scanner to provide continuous scanning.

Using mirrors, the longitudinal and lateral chromatic aberrations may be significantly reduced as compared with a telecentric lens made of glass elements. In general, the shapes of the first mirror 101, the second mirror 102, and the third mirror 103 may be chosen freely in order to appropriately magnify the section 182 of the panel 180. The first mirror 101 may be aspherical or may be spherical. The third mirror 103 may be aspherical or may be spherical. The second mirror 102 may be spherical or may be aspherical. One or more of the mirrors may also have special shapes, for example but not limited to a hyperbolic shape or a parabolic shape. For example, the first mirror 101 and the third mirror 103 aspherical, and the second mirror 102 may be spherical or aspherical.

The first mirror 101 and the third mirror 103 may be aspherical concave, and the second mirror 102 may be spherical or aspherical convex and may have the highest refractive power of the three mirrors. A first vertex of the first mirror 101, a second vertex of the second mirror 102, and a third vertex of the third mirror 103 may all lie on a common optical axis, wherein a first aperture of the first mirror 101, and a third aperture of the third mirror 103 may be decentred relative to the optical axis, and wherein a second aperture of the second mirror 102 remains symmetric, and non-decentred about the optical axis.

The first mirror 101, the second mirror 102, and the third mirror 103 may all have their vertex (or their center of the radius of curvature, respectively) on the same common axis, hereinafter referred to as the optical axis. In order to avoid vignetting, the object (and hence the image in turn) may be shifted perpendicularly to the optical axis. In addition, the apertures of the first mirror 101 and the third mirror 103 are decentred while their vertex is still lying on the optical axis. The aperture of the second mirror 102 remains symmetric (non-decentred) about the optical axis.

A ray emanating from the shifted on-axis point of the object that hits the center of the system stop defines the (on axis) chief ray 140*m* of the system. In a conventional rotationally symmetric optical system, this on-axis chief ray 140*m* coincides with the optical axis. When the object is shifted, the chief ray 140*m* may not coincide with the optical axis.

The first mirror 101 may have a first decentred aperture, and the third mirror 103 may have a third decentred aperture, wherein the first mirror 101 and the third mirror 103 are arranged so that the first aperture of the first mirror 101 has a first offset with the common optical axis, and the third aperture of the third mirror 103 has a third offset with the common optical axis.

The first aperture may be decentred, so that the first aperture has a first offset in relation to the common optical axis. The first offset may be formed between the common optical axis and the on axis chief ray 140*m* on the first mirror 101. Further, the third aperture may be decentred, so that the third aperture has a third offset in relation to the common optical axis. The third offset may be formed between the common optical axis and the on axis chief ray 140*m* on the third mirror 103.

Alternatively, the first mirror 101 may have a first decentred aperture, and the third mirror 103 has a third decentred aperture, wherein the first mirror 101 and the third mirror 103 are arranged so the chief ray 140*m* may not intersect the vertex of the first mirror 101 or the vertex of the third mirror 103, respectively.

An exemplary embodiment of the inspection device includes the second mirror 102 with a second aperture, where a second centre of the second aperture coincides with the common optical axis and with the chief ray 140*m*.

According to an exemplary embodiment of the inspection device, the first mirror 101 has a focal length $f_1$, the second mirror 102 has a focal length $f_2$, and the third mirror 103 has a focal length $f_3$, and wherein $|f_1|>|f_2|$, $|f_1|\leq|f_3|$, for $f_1$ of the first mirror 101, and
$|f_2|<|f_1|$, $|f_2|<|f_3|$, for $f_2$ of the second mirror 102.

The expression "focal length" may refer to the distance of a focus from the surface of a lens or curved mirror. As usual, the focal length may be defined in similar way for mirrors with curvatures like the focal length is defined for lens types being converging or diffusion lenses.

According to an exemplary embodiment of the inspection device, the first mirror 101, the second mirror 102, and the third mirror 103 form a telecentric system that is telecentric on the side of the panel 180 and/or on the side of the sensor 130.

The inspection device may be telecentric towards the panel 180 (object) and/or the sensor 130 (image). A telecentric system has the entrance pupil and/or the exit pupil at infinity. In particular, the imaging system may be telecentric towards the object (panel 180). The telecentricity towards the object may be ensured by proper placing of the system stop. However, the imaging system may be telecentric towards the panel 180 and towards the sensor 130. The imaging system may be telecentric towards the sensor 130 only.

According to an exemplary embodiment of the inspection device, a radius $R_1$ of the first mirror 101, a radius $R_2$ of the second mirror 102, and a radius $R_3$ of the third mirror 103 result in a field curvature being equal to zero or close to zero.

The expression "field curvature" may refer to a lens aberration where the sharpest focus of the lens is on a curved surface in the image space rather than a plane. Objects in the center and edges of the field are usually not in focus simultaneously. By choosing the radii of the first mirror 101, the second mirror 102, and the third mirror 103 to result in small or even zero field curvature, this type of aberration may be avoided. The so-called Petzval-Sum may be nearly completely corrected with an appropriate choice of the radii of the mirrors.

According to an exemplary embodiment of the inspection device the radius $R_1$ of the first mirror 101, and the radius $R_3$ of the third mirror 103 are chosen in a ratio of $R_3/R_1$ being equivalent or close to the magnification factor M.

Generally, an aspherization of the mirrors may allow for correcting off-axis image errors. Further, the aspherization of the mirrors may help to correct the residual error of the spherical aberration. However, the spherical aberration may already be well corrected by the choice of radii and distances.

Figure 2:
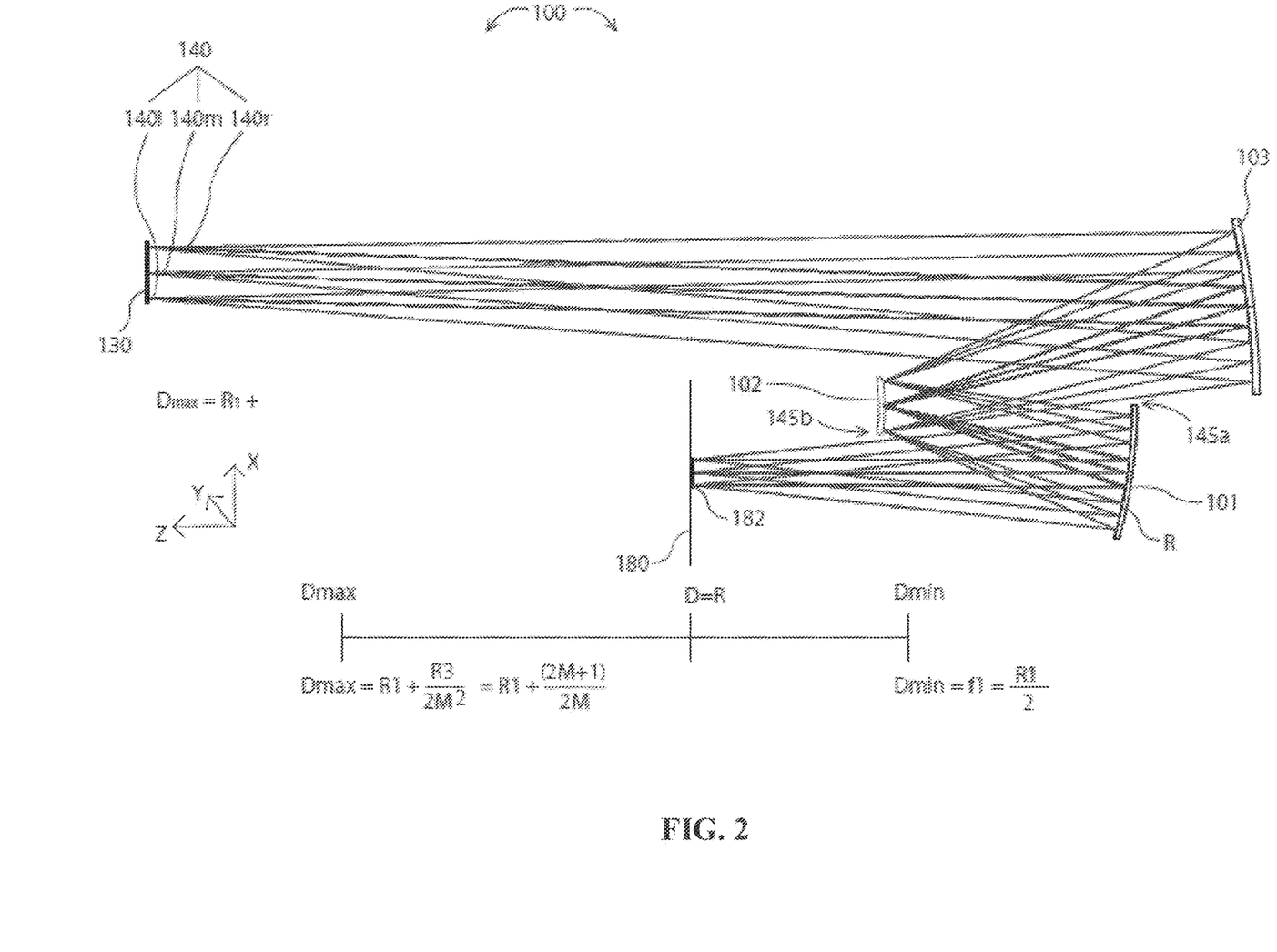
FIG. 2 is a schematic diagram of a second exemplary inspection device indicating additional beams and relations.

In a preferred embodiment, the first mirror 101 with a radius of $R_1$ may be located at a distance D being equal to or on the order of $R_1=2f_1$ relative to the panel 180, i.e., the object, or the section 182 of the panel 180, respectively. However, the object distance D may vary. A feasible value for the variation of the object distance may be obtained from the assumption that the rays emerging from the first mirror 101 towards the second mirror 102 should not diverge. Likewise, the rays emerging from the second mirror 102 and hitting the third mirror 103 should not converge. In case the rays from the first to the second mirror 102 diverge, the second mirror 102 should be larger than the first mirror 101, and a decentring of the apertures to avoid vignetting becomes very difficult. The same holds true if the rays from the second mirror 102 towards the third mirror 103 converge. A reasonable threshold for the object distance variation is hence that the rays are parallel either from the first to the second mirror 102 or from the second to the third mirror 103. The two limiting cases are depicted in the lower part of FIG. 2. From this assumption, the following lower and upper limits for the object distance are derived:

$$D_{min} = f_1 = \frac{R_1}{2} \quad \text{(Eq. 1)}$$

$$D_{max} = R_1 + \frac{R_3}{2M^2} = R_1 \cdot \frac{(2M+1)}{2M} \quad \text{(Eq. 2)}$$

For example, in a design for minimizing in residual Seidel-aberrations, the object is located in a distance $D=R_1$. In this specific setup, the spherical aberration at the first mirror is zero and the overall spherical aberration is very small. The second mirror 102 may be smaller than the first mirror 101 and the third mirror 103. Alternatively, the spherical aberration may be corrected by choosing the appropriate conical constants.

The overall distortion may be correctable even if the mirror apertures are decentred. Specifically the distortion arising from the second mirror 102 may be entirely corrected if the aperture lies very close to the mirror or is exactly on the second mirror 102. Further, astigmatism may be corrected if the mirror apertures are not decentred. However, the astigmatism may also be correctable to a high degree if the mirror apertures are decentred.

As shown in FIG. 1, the inspection device may further include a first planar fold mirror 111 and/or a second planar fold mirror 112, wherein the first planar fold mirror 111 is arranged before the first mirror 101, and wherein the second planar mirror 112 is arranged after the third mirror 103.

The inspection device may further include a camera unit to which the first mirror 101, the second mirror 102, and the third mirror 103 are mounted, and further includes an X/Y-stage adapted to receive the panel 180, where the X/Y-stage is movable in an X/Y-plane in accordance with a main plane of the panel 180 and relative to the camera unit, so that images of different sections 182 of the panel 180 may be captured depending on the relative position of the X/Y-stage relative to the camera unit. In particular, the camera unit may be stationary and the panel 180 may be movable.

The expression "X/Y-stages" may refer to a mechanical system generally constraining a motion in one plane, and here to a plane defined by extending in an X/Y-plane. That is, with the X/Y-stage the imaging system may allow for displaying a panel 180 being too large for the sensor 130 with one take or image. By shifting the relative position of the panel 180 and the camera unit comprising the first, second, and third mirrors 101-103, with every chosen relative position a different part or a different section of the panel 180 may be displayed on the sensor 130.

The inspection device illumination may be coupled into the optical path. In particular, the illumination may be coupled into the optical path between a last mirror (which may be the first mirror 101 or the first planar fold mirror 111) and the panel 180 to be inspected. For coupling the illumination into the optical path, a semi-transparent mirror may be used.

A wavefront aberration may be expressed by Fringes-Zernike also showing non-rotationally symmetrical components on the sensor 130 axis. An aspherical formula is given by Eq. 3 applying to the height of the sagitta z parallel to the optical axis over the height h perpendicular to the optical axis:

$$z(h) = \frac{h^2/r0}{1+\sqrt{1-(1+k)(h/r0)^2}} = a4 \cdot h^4 + a6 \cdot h^6 + \ldots + a16 \cdot h^{16} \quad \text{(Eq. 3)}$$

where r0 [mm] refers to the radius of curvature of the vertex, k is the conical constant, and a4, a6, ..., a16 are aspherical coefficients.

A definition of the Zernike-Fringe polynomial Pi for the coefficient Zi may be given in accordance with Tab. 1B-Tab. 4B, shown below, where p is the normalized pupil coordinate and A the azimuth angle. Eq. 4 applies to the wavefront error W in the exit pupil:

$$W(p, A) = \sum_{i=1}^{37} Z_i \cdot P_i(p, A) \quad \text{(Eq. 4)}$$

The normalized pupil coordinate p has no unit and can assume values between 0 and 1. The wavefront error W—and thus the coefficients Zi—are given in units of wavelength.

FIG. 1 shows in a 2D view an inspection device 100 having a first mirror 101, a second mirror 102 and a third mirror 103. Further, the inspection device 100 includes a first planar fold mirror 111 and a second planar fold mirror 112. Light coming from a section 182 (see FIG. 3) of a panel 180, the panel 180 to be inspected, is reflected by the first planar fold mirror 111 towards the first mirror 101 being concave. Light from the first (concave) mirror 101 is reflected to the second (convex) mirror 102, and the light is reflected from the second mirror 102 towards the third (concave) mirror 103. The light is reflected from the third mirror 103 by the second planar fold mirror 112 towards a sensor 130. An image of the section 182 of the panel 180, is displayed upon and/or reflected towards the sensor 130 so that an image of the section 182 is displayed in the sensor 130 with a magnification factor M. The magnification factor M which is the enlargement of the section 182 on the sensor 130 may in principle be, for example, M>1, >1.5, >2, >2.5, >3, >3.5, >4, or >5. An optical path 140 starts from the panel 180 (or the section 182) and may subsequently proceed to the first planar fold mirror 111, the first mirror 101, to the second mirror 102, to the third mirror 103, and then to the second planar fold mirror 112 before being displayed in an enlarged version on the sensor 130. A direction of the light or optical path 140 may in the Z-direction. The section 182 of panel 180 (see also FIG. 3A) and the sensor 130 may be arranged parallel to each other and may both have basically an extension perpendicular to the Z-axis in a X-direction and/or Y-direction of the Cartesian coordinate system. According to the five reflections, the image may be inversely displayed on the sensor 130. The optical path has a chief ray 140*m* and the two marginal rays 140*l* and 140*r*, respectively, as shown in FIG. 1 in order to illustrate that there is an inverse image on the sensor 130 having a specific extension and also being enlarged towards the sensor 130.

The optical path 140 may be free of any shading or vignetting which could occur between the first planar fold mirror 111 and the second mirror 102, so the optical path 140 has a first free passage 145*a* between the first planar fold mirror 111 and the second mirror 102. Further, the optical path 140 may have a second free passage 145*b* between the first mirror 101 towards the third mirror 103.

Due to a magnification factor of 1 or higher and a greater extension of the panel 180 compared to the sensor 130, at any moment in time the area which may be inspected may only be a section 182 (a part) of the complete panel 180.

According to the exemplary embodiment shown in FIG. 1, the focal length f is close to infinite, so that the system is double telecentric, i.e., telecentric on both sides: towards the object-side, and towards the sensor-side. For example, for a magnification factor M=2×, a numerical aperture (on the object side) is 0.1, wherein an image size is 23×23 mm$^2$. Assuming a blue LED at 460 nm, the NA of 0.1 yields a Nyquist frequency of 435 lp/mm with incoherent illumination. About half of Nyquist may be considered the resolution of the system, which yields about 200 lp/mm. The optical data of the embodiment shown in FIG. 1 is given in table 1A.

TABLE 1A

Optical data for embodiment No 1, magnification 2x, double telecentric

| Focal length f | Close to ∞ (double telecentric) |
| --- | --- |
| magnification | 2X |
| Numerical aperture | 0.1 |
| Sensor size | 23 × 23 mm$^2$ (area sensor) |

| Surface No | Element | Radius r0 | conical constant | distance | Tilt |
| --- | --- | --- | --- | --- | --- |
| 0 | Object plane | — | | 75.000 | |
| 1 | Fold mirror 1 | infinity | 0.0000 | −93.667 | 45° |
| 2 | EVENASPH M1 | 194.5213 | −2.6474 | 97.1048 | 0 |
| 3 | STANDARD M2 | 130.1010 | 0.0000 | 0.0000 | 0 |
| 4 | STO | infinity | 0.0000 | −189.753 | 0 |
| 5 | EVENASPH M3 | 383.461 | −3.2386 | 230.000 | 0 |
| 6 | Fold mirror 2 | infinity | 0.0000 | −254.139 | 45° |
| 7 | Image plane | — | | | |

| Surface No | a4 | a6 | a8 | a10 | a12 | a14 | a16 |
| --- | --- | --- | --- | --- | --- | --- | --- |
| 2 | 4.7273E−08 | −1.9567E−13 | 4.3868E−18 | 0 | 0 | 0 | 0 |
| 5 | 6.6868E−09 | −2.5486E−14 | 0 | 0 | 0 | 0 | 0 |

For a specific embodiment of FIG. 1, the Zernike coefficients are listed in Tab. 1B.

TABLE 1B

Zernike coefficients for embodiment 1

| Z 2 | 0.000: | (p) * COS (A) |
| --- | --- | --- |
| Z 3 | −0.039: | (p) * SIN (A) |
| Z 4 | 0.013: | (2p^2 − 1) |
| Z 5 | −0.041: | (p^2) * COS (2A) |
| Z 6 | 0.000: | (p^2) * SIN (2A) |
| Z 7 | 0.000: | (3p^2 − 2) p * COS (A) |
| Z 8 | −0.021: | (3p^2 − 2) p * SIN (A) |
| Z 9 | 0.084: | (6p^4 − 6p^2 + 1) |
| Z 10 | 0.000: | (p^3) * COS (3A) |
| Z 11 | −0.008: | (p^3) * SIN (3A) |
| Z 12 | −0.021: | (4p^2 − 3) p^2 * COS (2A) |
| Z 13 | 0.000: | (4p^2 − 3) p^2 * SIN (2A) |
| Z 14 | 0.000: | (10p^4 − 12p^2 + 3) p * COS (A) |
| Z 15 | −0.001: | (10p^4 − 12p^2 + 3) p * SIN (A) |
| Z 16 | −0.001: | (20p^6 − 30p^4 + 12p^2 − 1) |
| Z 17 | −0.009: | (p^4) * COS (4A) |
| Z 18 | 0.000: | (p^4) * SIN (4A) |
| Z 19 | 0.000: | (5p^2 − 4) p^3 * COS (3A) |
| Z 20 | 0.000: | (5p^2 − 4) p^3 * SIN (3A) |
| Z 21 | 0.001: | (15p^4 − 20p^2 + 6) p^2 * COS (2A) |
| Z 22 | 0.000: | (15p^4 − 20p^2 + 6) p^2 * SIN (2A) |
| Z 23 | 0.000: | (35p^6 − 60p^4 + 30p^2 − 4) p * COS (A) |
| Z 24 | 0.000: | (35p^6 − 60p^4 + 30p^2 − 4) p * SIN (A) |
| Z 25 | 0.000: | (70p^8 − 140p^6 + 90p^4 − 20p^2 + 1) |

Spherical aberration of the lowest order (Z9) and some astigmatism (Z5 and Z12) and KOMA (Z8) may occur. Other aberrations are corrected, and the Zernike coefficients starting from Z13 on are virtually zero.

FIG. 2 shows an exemplary second embodiment of an inspection device 100 similar to the first embodiment shown in FIG. 2, the second embodiment again having a first (concave) mirror 101, a second (convex) mirror 102, and a third (concave) mirror 103. However, the planar fold mirror 111 and the second planar fold mirror 112 have been omitted, compared to FIG. 1. The light or image may similarly originate from the panel 180, and travel to the first concave, mirror 101, from there towards the second mirror 102, and from there toward the third mirror 103, before the image is displayed on the sensor 130. Again, the general propagation of the optical path 140 may be the direction of the (positive) Z-axis within a Cartesian coordinate system, and then, according to the three reflections and according to an equal orientation of the panel 180 and the sensor 130, the image is inversely displayed on the sensor 130. The right part 140r, the middle part, or chief ray 140m, and the left part 140l of the optical path 140 are depicted with three beams, each, according to a general rule applied in optics. An image of the section 182 of the panel may be displayed with a magnification factor 2× on the sensor 130.

According to the inspection device shown in FIG. 2, the focal length is 918 mm, and the system is telecentric only on the object side. The magnification factor M=2×, a numerical aperture (on the object side) is 0.1. Again, an image sensor of 23×23 mm$^2$ was chosen. No fold mirror was used in embodiment of FIG. 2. The optical data of the embodiment shown in FIG. 2 is given in Table 2A.

TABLE 2A

Optical data for embodiment No 2, magnification 2x, object side telecentric

| Focal length f | 918 mm (object side telecentric) |
| --- | --- |
| magnification | 2X |

TABLE 2A-continued

Optical data for embodiment No 2, magnification 2x, object side telecentric

| Numerical aperture | 0.1 | | | |
|---|---|---|---|---|
| Sensor size | 23 × 23 mm² | | | |

| Surface No | Element | Radius r0 | conical constant | distance | Tilt |
|---|---|---|---|---|---|
| 0 | Object plabe | — | | 198.433 | |
| 2 | EVENASPH M1 | −224.635 | −3.484 | −111.533 | 0 |
| 3 | STANDARD M2 | −141.933 | 0.0000 | 0.0000 | 0 |
| 4 | STO | — | 0.0000 | 166.148 | 0 |
| 5 | EVENASPH M3 | −377.369 | −3.403 | −500.000 | 0 |
| 6 | Image plane | — | | | |

| Fläche | a4 | a6 | a8 | a10 | a12 | a14 | a16 |
|---|---|---|---|---|---|---|---|
| 2 | −3.9369E−08 | 4.7331E−13 | −1.3131E−17 | 0 | 0 | 0 | 0 |
| 5 | −7.1357E−09 | 3.3049E−14 | 0 | 0 | 0 | 0 | 0 |

For a specific embodiment of FIG. 2, the Zernike coefficients are listed in Tab. 2B.

TABLE 2B

| Zernike coefficients for embodiment 2 | | |
|---|---|---|
| Z 2 | 0.000: | (p) * COS (A) |
| Z 3 | −0.004: | (p) * SIN (A) |
| Z 4 | −0.007: | (2p^2 − 1) |
| Z 5 | −0.037: | (p^2) * COS (2A) |
| Z 6 | 0.000: | (p^2) * SIN (2A) |
| Z 7 | 0.000: | (3p^2 − 2) p * COS (A) |
| Z 8 | 0.001: | (3p^2 − 2) p * SIN (A) |
| Z 9 | 0.011: | (6p^4 − 6p^2 + 1) |
| Z 10 | 0.000: | (p^3) * COS (3A) |
| Z 11 | −0.001: | (p^3) * SIN (3A) |
| Z 12 | −0.038: | (4p^2 − 3) p^2 * COS (2A) |
| Z 13 | 0.000: | (4p^2 − 3) p^2 * SIN (2A) |
| Z 14 | 0.000: | (10p^4 − 12p^2 + 3) p * COS (A) |
| Z 15 | 0.002: | (10p^4 − 12p^2 + 3) p * SIN (A) |
| Z 16 | 0.000: | (20p^6 − 30p^4 + 12p^2 − 1) |
| Z 17 | −0.011: | (p^4) * COS (4A) |
| Z 18 | 0.000: | (p^4) * SIN (4A) |
| Z 19 | 0.000: | (5p^2 − 4) p^3 * COS (3A) |
| Z 20 | 0.000: | (5p^2 − 4) p^3 * SIN (3A) |
| Z 21 | 0.001: | (15p^4 − 20p^2 + 6) p^2 * COS (2A) |
| Z 22 | 0.000: | (15p^4 − 20p^2 + 6) p^2 * SIN (2A) |
| Z 23 | 0.000: | (35p^6 − 60p^4 + 30p^2 − 4) p * COS (A) |
| Z 24 | 0.000: | (35p^6 − 60p^4 + 30p^2 − 4) p * SIN (A) |
| Z 25 | 0.000: | (70p^8 − 140p^6 + 90p^4 − 20p^2 + 1) |

Spherical aberration is better corrected compared to Tab. 1B (or FIG. 1). However, there is a greater astigmatism. The distortion is close to zero.

Further, FIG. 2 shows that in an example where the first mirror 101 has a radius of R, then the panel 180, or the section 182, respectively, may be located in a distance D of R=2f from the mirror 101, where f is the focal length of mirror 1. This setup corresponds to the Offner ansatz and corresponds to the preferred embodiment. In general the distance D may vary. Feasible variations are indicated, in principle, in FIG. 2 where the minimum object distance $D_{min}$ and the maximum object distance $D_{max}$ calculated from the formulas given above is shown. However, the specific embodiment of FIG. 2 shows that, here, the distance D is close to R.

In a third exemplary embodiment, the magnification factor M=2.8×, showing an extension to larger magnifications. A numerical aperture (on the object side) is 0.15 and an image size chosen is 24×36 mm², which corresponds to a full frame sensor. The system is double telecentric.

Figure 3A:
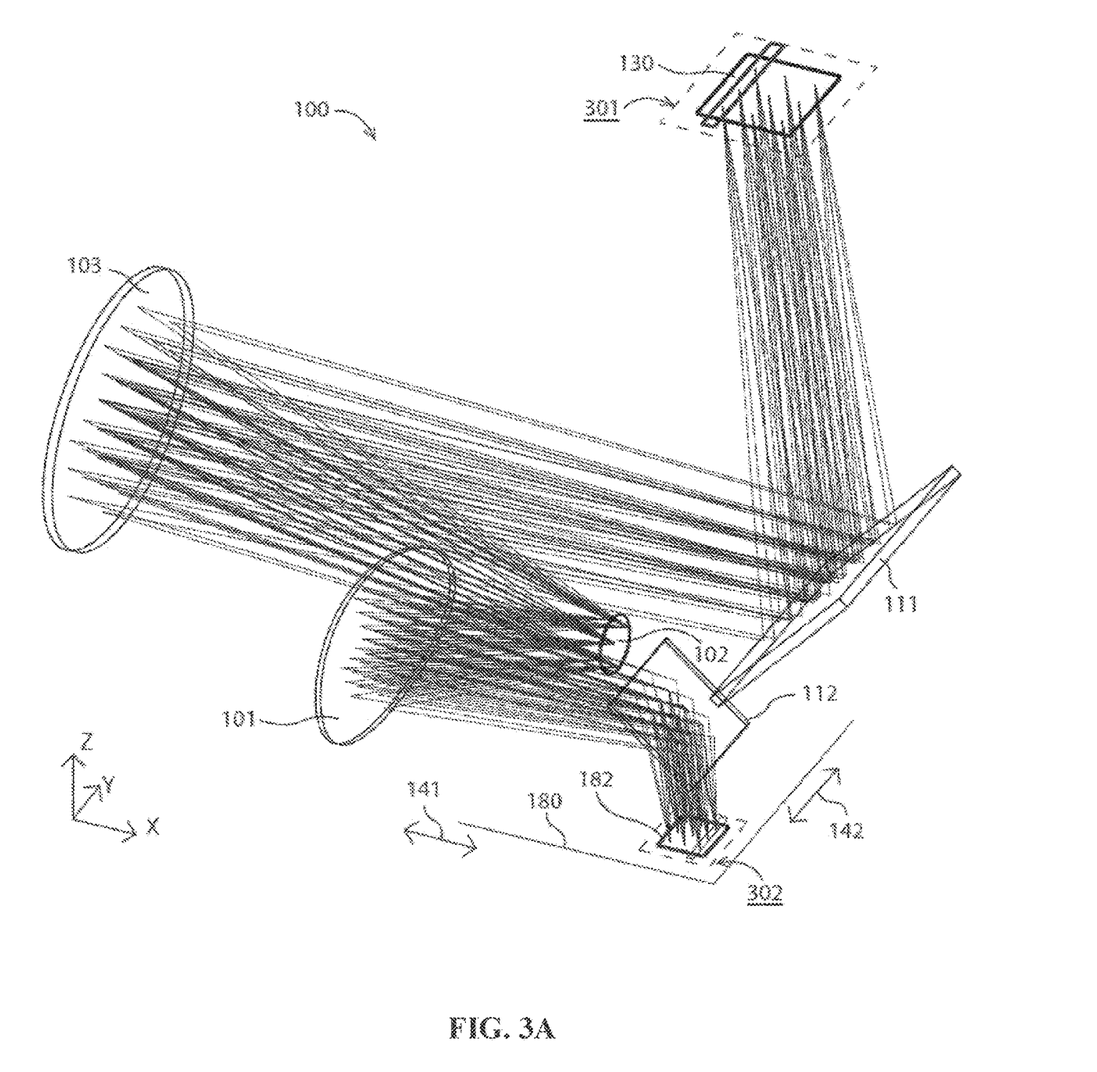
FIG. 3A is a schematic diagram of the inspection device of FIG. 2 in a perspective view.

Assuming a blue LED at 460 nm we obtain a resolution of about 300 lp/mm on the object side. The optical data of the embodiment shown in FIG. 3 is given in Table 3A. The Zernike coefficients are listed in Table 3B.

TABLE 3A

Optical data for embodiment No 3, magnification 2.8x, double telecentric

| Focal length f | Close to ∞ (double telecentric) |
|---|---|
| magnification | 2.8X |
| Numerical aperture | 0.15 |
| Sensor size | 24 × 36 mm² |

| Surface No | Element | Radius r0 | conical constant | distance | Tilt |
|---|---|---|---|---|---|
| 0 | Object plane | Plan | | 90.000 | |
| 1 | Fold mirror 1 | — | 0.0000 | −80.138 | 45° |
| 2 | EVENASPH M1 | 204.490 | −4.820 | 102.245 | 0 |
| 3 | EVENASPH M2 | 152.727 | −1.374 | 0.0000 | 0 |
| 4 | STO | — | 0.0000 | −273.785 | 0 |

TABLE 3A-continued

Optical data for embodiment No 3, magnification 2.8x, double telecentric

| | 5 | EVENASPH M3 | 558.388 | 0.338 | 200.000 | 0 |
|---|---|---|---|---|---|---|
| | 6 | Fold mirror 2 | — | 0.0000 | −614.46 | 45° |
| | 7 | Image plane | — | | | |

| Fläche | a4 | a6 | a8 | a10 | a12 | a14 | a16 |
|---|---|---|---|---|---|---|---|
| 2 | 7.2939E−08 | −2.1298E−12 | 1.1481E−16 | −3.359E−21 | 3.484E−26 | 0 | 0 |
| 3 | 7.3134E−08 | −3.5623E−12 | −1.0794E−13 | 3.946E−16 | 0 | | |
| 5 | −4.9104E−10 | −9.9568E−16 | −2.1724E−22 | −1.588E−25 | 0 | | |

TABLE 3B

Zernike coefficients for embodiment 3

| Z 2 | 0.000: | $(p) * \cos(A)$ |
|---|---|---|
| Z 3 | −0.013: | $(p) * \sin(A)$ |
| Z 4 | −0.005: | $(2p^2 − 1)$ |
| Z 5 | −0.076: | $(p^2) * \cos(2A)$ |
| Z 6 | 0.000: | $(p^2) * \sin(2A)$ |
| Z 7 | 0.000: | $(3p^2 − 2) p * \cos(A)$ |
| Z 8 | 0.011: | $(3p^2 − 2) p * \sin(A)$ |
| Z 9 | −0.003: | $(6p^4 − 6p^2 + 1)$ |
| Z 10 | 0.000: | $(p^3) * \cos(3A)$ |
| Z 11 | −0.026: | $(p^3) * \sin(3A)$ |
| Z 12 | −0.170: | $(4p^2 − 3) p^2 * \cos(2A)$ |
| Z 13 | 0.000: | $(4p^2 − 3) p^2 * \sin(2A)$ |
| Z 14 | 0.000: | $(10p^4 − 12p^2 + 3) p * \cos(A)$ |
| Z 15 | 0.015: | $(10p^4 − 12p^2 + 3) p * \sin(A)$ |
| Z 16 | −0.010: | $(20p^6 − 30p^4 + 12p^2 − 1)$ |

TABLE 3B-continued

Zernike coefficients for embodiment 3

| Z 17 | −0.058: | $(p^4) * \cos(4A)$ |
|---|---|---|
| Z 18 | 0.000: | $(p^4) * \sin(4A)$ |
| Z 19 | 0.000: | $(5p^2 − 4) p^3 * \cos(3A)$ |
| Z 20 | 0.000: | $(5p^2 − 4) p^3 * \sin(3A)$ |
| Z 21 | 0.003: | $(15p^4 − 20p^2 + 6) p^2 * \cos(2A)$ |
| Z 22 | 0.000: | $(15p^4 − 20p^2 + 6) p^2 * \sin(2A)$ |
| Z 23 | 0.000: | $(35p^6 − 60p^4 + 30p^2 − 4) p * \cos(A)$ |
| Z 24 | 0.005: | $(35p^6 − 60p^4 + 30p^2 − 4) p * \sin(A)$ |
| Z 25 | −0.019: | $(70p^8 − 140p^6 + 90p^4 − 20p^2 + 1)$ |

A fourth embodiment specifically uses a large line sensor, which lies perpendicularly to the symmetry plane of the three mirrors. For an exemplary fourth embodiment, the line can be as long as 82 mm. This is a typical large line sensor used in line scan applications. The line may consist of only one pixel row, or it can be a TDI sensor with up to 256 separate pixel lines. The pixel size of the sensor is typically 5 μm.

According to the inspection device under the fourth embodiment, the focal length is 793 mm, and the system is telecentric on the object side. The magnification factor M=1.67x, a numerical aperture (on the object side) is 0.09. The resolution attained on the object side is about 170 lp/mm. The optical data of the embodiment is given in Table 4A and the Zernike coefficients are listed in Table 4B.

TABLE 4A

Optical data for embodiment No 4, magnification 1.67x, object side telecentric

| Focal length f | 793 mm (object side telecentric) |
|---|---|
| magnification | 1.67X |
| Numerical aperture | 0.09 |
| Sensor size | Line sensor length 82 mm |

| Surface No | Element | Radius r0 | conical constant | distance | Tilt |
|---|---|---|---|---|---|
| 0 | Object plane | Plan | | 80.000 | |
| 1 | Fold mirror 1 | — | 0.0000 | −86.613 | 45° |
| 2 | EVENASPH M1 | 184.098 | 0.286 | 92.05 | 0 |
| 3 | STO | — | — | 1.69 | 0 |
| 4 | Standard M2 | 108.375 | 0.0000 | −112.22 | 0 |
| 5 | EVENASPH M3 | 256.58 | −0.041 | 95.00 | 0 |
| 6 | Fold mirror 2 | — | 0.0000 | −218.53 | 45° |
| 7 | Image plane | — | | | |

| Fläche | a4 | a6 | a8 | a10 | a12 | a14 | a16 |
|---|---|---|---|---|---|---|---|
| 2 | −4.581E−09 | 9.631e−15 | −3.044e−18 | −1.189e−20 | 2.359e−24 | 0 | 0 |
| 5 | −1.571e−09 | 3.939e−14 | −4.601e−18 | 7.649e−23 | 0 | 0 | 0 |

TABLE 4B

Zernike coefficients for embodiment 4

| Z 2 | 0.000: | $(p) * \cos(A)$ |
|---|---|---|
| Z 3 | 0.007: | $(p) * \sin(A)$ |
| Z 4 | 0.006: | $(2p^2 − 1)$ |
| Z 5 | 0.008: | $(p^2) * \cos(2A)$ |
| Z 6 | 0.000: | $(p^2) * \sin(2A)$ |
| Z 7 | 0.000: | $(3p^2 − 2) p * \cos(A)$ |
| Z 8 | 0.003: | $(3p^2 − 2) p * \sin(A)$ |
| Z 9 | −0.007: | $(6p^4 − 6p^2 + 1)$ |
| Z 10 | 0.000: | $(p^3) * \cos(3A)$ |
| Z 11 | 0.000: | $(p^3) * \sin(3A)$ |
| Z 12 | −0.026: | $(4p^2 − 3) p^2 * \cos(2A)$ |

TABLE 4B-continued

Zernike coefficients for embodiment 4

| | | |
|---|---|---|
| Z 13 | 0.000: | $(4p^2 - 3) p^2 * \text{SIN} (2A)$ |
| Z 14 | 0.000: | $(10p^4 - 12p^2 + 3) p * \text{COS} (A)$ |
| Z 15 | −0.001: | $(10p^4 - 12p^2 + 3) p * \text{SIN} (A)$ |
| Z 16 | 0.000: | $(20p^6 - 30p^4 + 12p^2 - 1)$ |
| Z 17 | −0.003: | $(p^4) * \text{COS} (4A)$ |
| Z 18 | 0.000: | $(p^4) * \text{SIN} (4A)$ |
| Z 19 | 0.000: | $(5p^2 - 4) p^3 * \text{COS} (3A)$ |
| Z 20 | 0.000: | $(5p^2 - 4) p^3 * \text{SIN} (3A)$ |
| Z 21 | 0.001: | $(15p^4 - 20p^2 + 6) p^2 * \text{COS} (2A)$ |
| Z 22 | 0.000: | $(15p^4 - 20p^2 + 6) p^2 * \text{SIN} (2A)$ |
| Z 23 | 0.000: | $(35p^6 - 60p^4 + 30p^2 - 4) p * \text{COS} (A)$ |
| Z 24 | 0.000: | $(35p^6 - 60p^4 + 30p^2 - 4) p * \text{SIN} (A)$ |
| Z 25 | 0.000: | $(70p^8 - 140p^6 + 90p^4 - 20p^2 + 1)$ |

FIG. 3A shows the inspection device 100 in a perspective view. This shows the first mirror 101, the second mirror 102, and the third mirror 103 extend in three dimensions and are spherical or aspheric mirrors. A first quadrangle 301 marked with a dashed line and surrounding the sensor 130 is shown in detail by FIG. 3B. A second quadrangle 302 marked with a dashed line and surrounding the panel 180 is depicted with more detail with FIG. 3C. An area within the first quadrangle 301 and surrounding an area of the sensor 130 may represent an area within the second quadrangle, in particular the section 182 of the panel 180. The section 182, however, may be smaller than an area of the complete panel 180.

Within the inspection device 100, the sensor 130, the first mirror 101, the second mirror 102, the third mirror 103, the first planar fold mirror 111, and the second planar fold mirror 112 may be fixedly arranged to each other. By a movement in X-direction 141, and by a movement in Y-direction 142 of the panel 180 relative to the sensor 130, the section 182 changes its position on the panel 180. This may allow for a stepwise scan of the panel 180 in order to achieve a whole inspection image of the panel 180. The whole inspection image may include images of the sensor 130 for different (or shifted in Y-/Y-direction) positions for the section 182 on the panel 180.

Figure 3B:
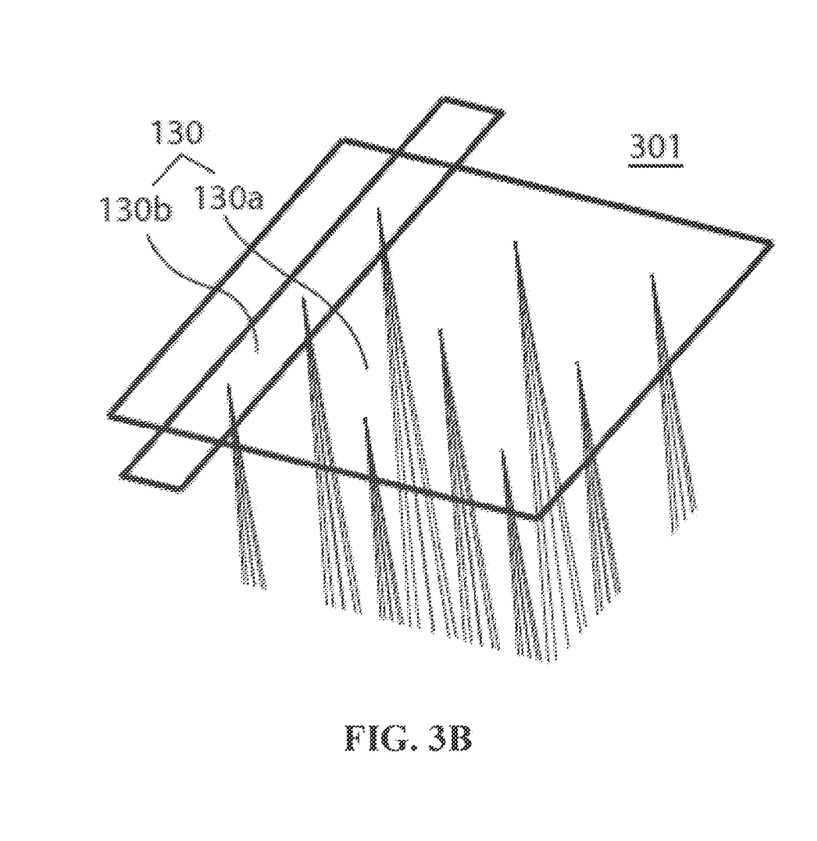
FIG. 3B is a schematic diagram showing a detail of a first quadrangle of FIG. 3A.

FIG. 3B shows a sensor 130 of the inspection device in a perspective view in two variations on the above-described embodiments. The sensor 130 may have a rectangular form of a surface sensor 130a, i.e., that the surface sensor 130a captures images extending both, in a X-direction, and a Y-direction. Alternatively, the sensor 130 may be a line sensor 130b being adapted to capture a one-dimensional image of an area spanned by the X-axis and the Y-axis by moving the panel 180 along the X-axis. An extension of the line sensor 130b may represent one line of discrete display points on the panel 180 (compare FIG. 3A and FIG. 3B).

Figure 3C:
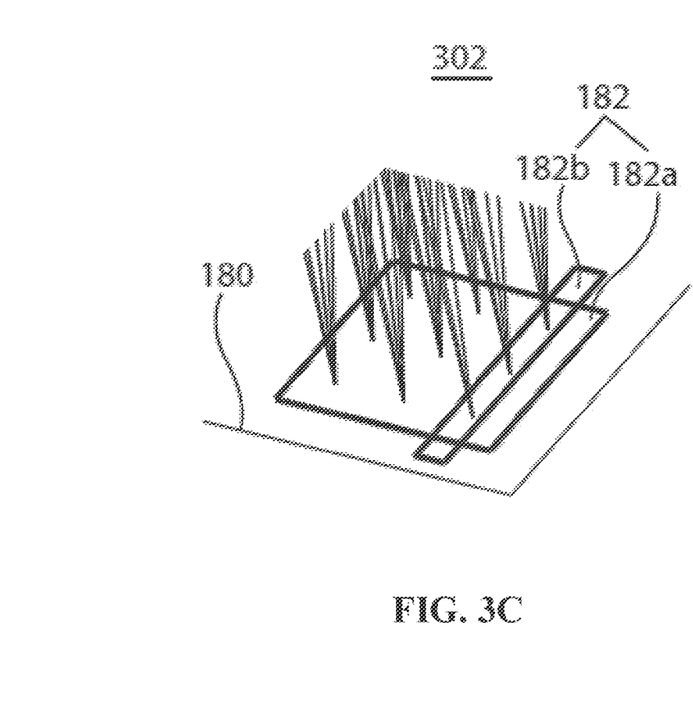
FIG. 3C is a schematic diagram showing a detail of a second quadrangle of FIG. 3A.

FIG. 3C, in turn, shows the section 182 of the panel 180 as captured by the sensor 130 respectively corresponding to the surface sensor 130a and the line sensor 130b. Accordingly, the section 182 may extend in both, the X-direction, and the Y-direction, and may therefore have the form of a rectangular section 182a of the panel 180. The section 182 may only include a line section 182b of the panel when using a line sensor 130b.

Figure 4:
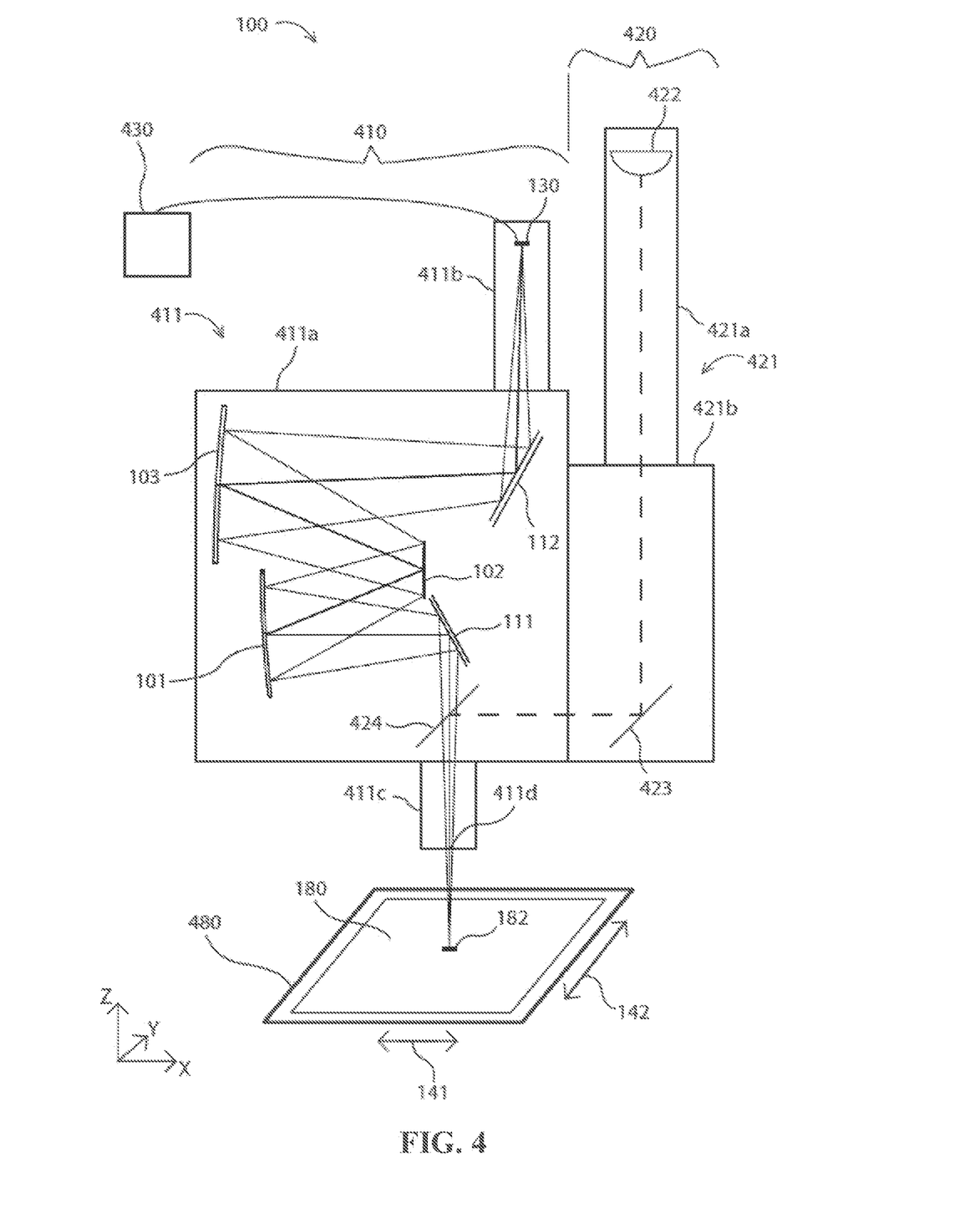
FIG. 4 is a schematic diagram showing the inspection device of FIG. 2 with an X/Y-stage and a housing.

FIG. 4 shows the inspection device 100 including an X/Y-stage 480, a camera unit 410, an illumination unit 420, and a controller 480.

The camera unit 410 has a camera housing 411 in which the sensor 130, the first mirror 101, the second mirror 102, the third mirror 103, the first planar fold mirror 111, and the second planar fold mirror 112 are arranged. The camera housing 411 may, in particular, include a core housing 411a for the first mirror 101, the second mirror 102, the third mirror 103. Further, the camera housing 411 may have an ocular tube 411b for the sensor 130 and may include an end tube 411c having an opening 411d. A vision spot of the end tube 411c and/or the opening 411d, respectively, is directed perpendicularly to the panel 180 and may coincide with the position of the section 182 from which an image may be taken. There may be a certain distance between the opening 411d and the panel 180, or the section 182, respectively. The camera housing 411a, the ocular tube 411b, and the end tube 411b may be fixedly and detachably mounted to each other, so that the sensor 130, the first mirror 101, the second mirror 102, the third mirror 103, the first planar fold mirror 111, and the second planar fold mirror 112 are fixedly arranged to each other.

The illumination unit 420 may include an illumination housing 421, a light source 422, and a fold mirror 423. The light source 422 and the fold mirror 423 may be fixedly arranged in the illumination housing 421. A beam splitter 424 may be arranged inside the camera housing 411, and between the first planar fold mirror 111 and the opening 411d. However, functionally, the beam splitter 424 may be regarded as a component of the illumination unit 420. Light being generated by the light source 422 may be reflected from the fold mirror 423 towards the beam splitter 424 which then reflects the light at least partially towards the section 182 to illuminate it. The illuminated section 182 of the panel 180 then may reflect light back towards the beam splitter 424 which in turn may at least partially pass the light towards the first planar fold mirror 111, so that eventually an image of the section 182 may be captured by the sensor 130 at the end of the optical path 140 (see FIG. 1 and FIG. 2). The sensor 130 may be coupled to a computer 430 which then may process one or a plurality of images. The illumination unit 420 may be mounted to the camera unit 410 and may be as an alternative an integral part of the camera unit 410.

The X-/Y-stage of the inspection device 100 may be adapted to receive the panel 180 and allow for the relative movement of the panel 180 relative to the opening 411d, or the camera unit 410, respectively. By this relative movement in X-direction 141 and/or Y-direction 142, the panel 180 may be stepwise scanned so images of different sections 182 corresponding to different positions of the panel 180 relative to the camera unit 410 may be captured. The computer 430 may then assemble the captured images for an evaluation of the complete panel 180.

Figure 5:
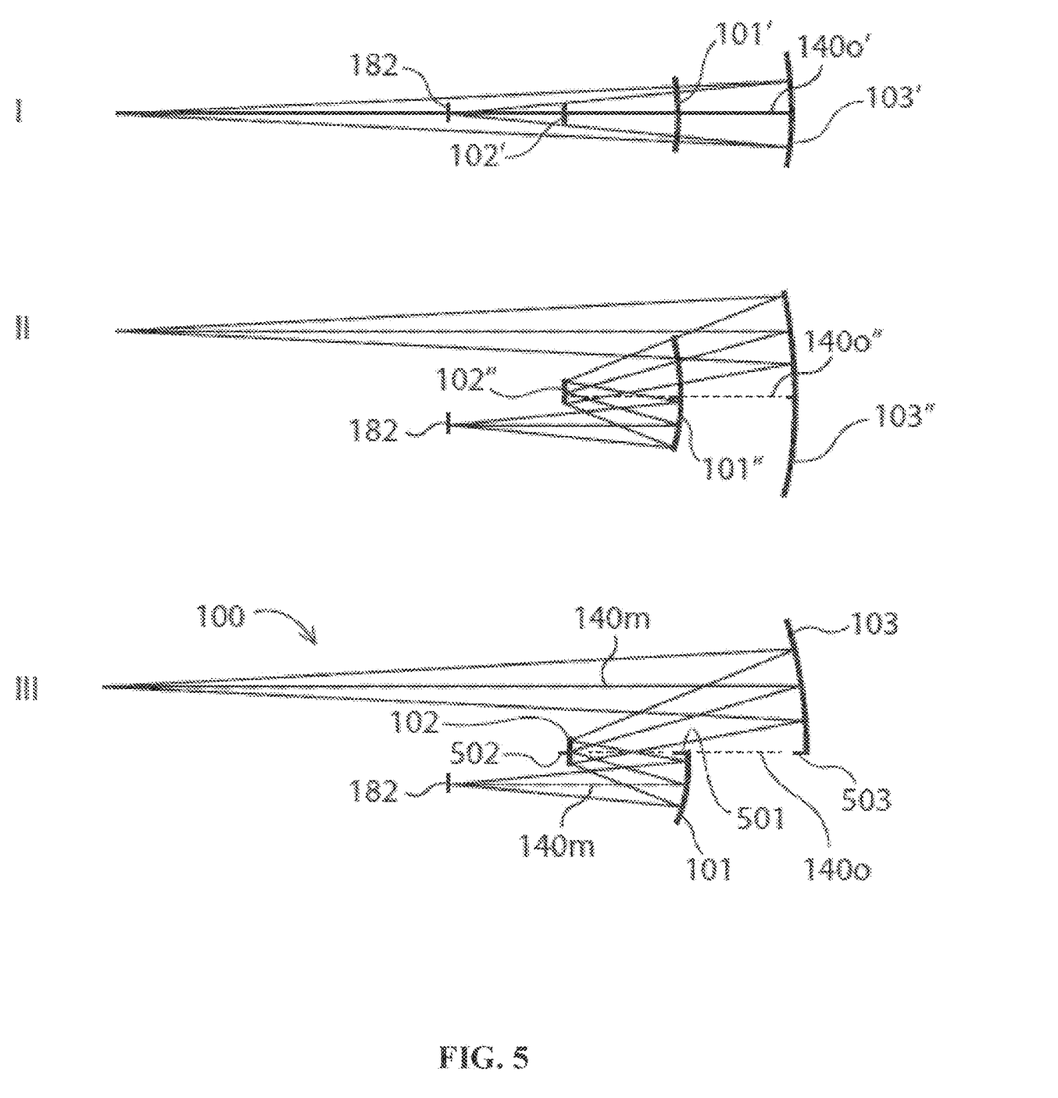
FIG. 5 shows three views of a general setup of the inspection device of FIG. 2 with (I) the apertures centred and the object non-shifted, (II) the apertures centred and the object shifted, and (III) the apertures decentred and the object shifted.

FIG. 5 depicts the decentred apertures and shifted object. In the upper part (I) of FIG. 5A, the apertures of the first concave mirror 101', the second convex mirror 102', and the third concave mirror 103' are all centred about a common optical axis 140o'. This is a typical rotational symmetric arrangement. In the middle part (II) of FIG. 5 the object 182 is shifted perpendicularly (relative) to the optical axis 140o". The apertures are still centred about the optical axis 140o". In the lower part (III) of FIG. 5, depicting an embodiment of the inspection system 100, an aperture 521 (see FIG. 6) of the first mirror 501, and the aperture 523 (see FIG. 6) of the third mirror 503 are decentred and the object 182 is shifted. Hence, in this case no vignetting of the rays occurs. The centres (vertices) 501, 502, 503 of the radii of curvature of the mirrors 101, 102, 103, respectively, still lie on the optical axis 140o. An axis of the chief ray 140m does not coincide with the optical axis 140o.

Figure 6:
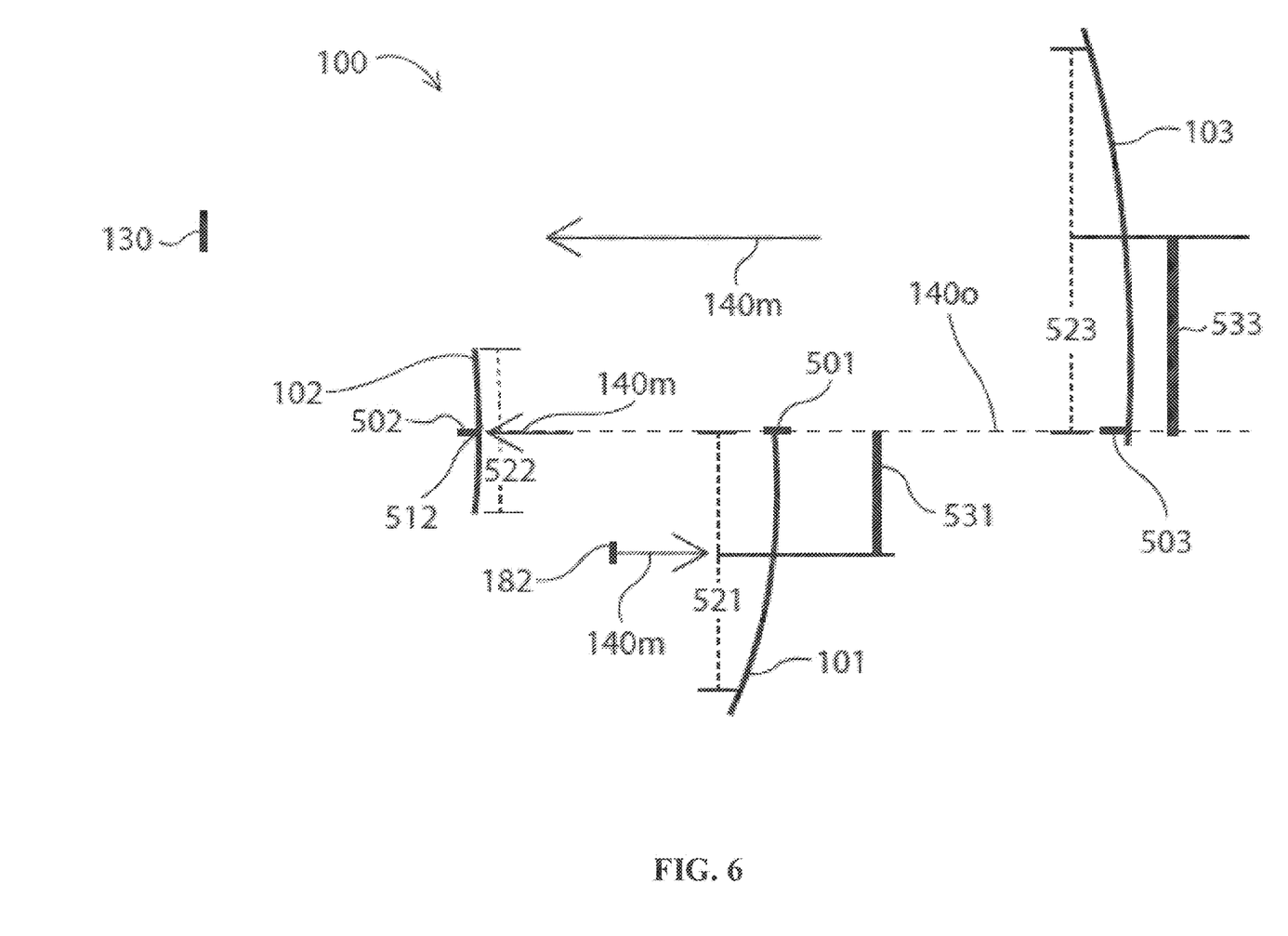
FIG. 6 is a schematic diagram showing the decentred apertures of the first and third mirror and the second mirror of FIG. 2 with a centred aperture.

FIG. 6 shows in more detail with a schematically cross-sectional view how the apertures 521 of the first mirror 501 and the aperture 523 of the third mirror 503 of the inspection system shift relative to the optical axis 140o. The first, concave, mirror 101 and/or the second, concave, mirror 103 may be both aspheric and may include a common symmetry axis which may be given with the centre or (first) vertex 501 of the first mirror 101 and the centre or (third) vertex 503 of the third mirror 503, respectively. This symmetry axis coincides with the optical axis shown in FIG. 5, so that the vertex 501 of the first mirror 101 and the vertex 503 of the third mirror 103 both lie on the optical axis 140o. However, the (first) aperture 521 of the first mirror 101 may be decentred perpendicularly by an offset 531, and the (third) aperture 523 of the third mirror 103 may be decentred perpendicularly by an offset 533, relative to the optical axis 140o, respectively. A direction of the shift 531 of the aperture 521 of the first mirror 101 may be opposite to the shift 533 of the aperture 523 of the third mirror 103.

FIG. 6 further illustrates that the on axis chief ray 140m does not hit the vertices of the mirrors 101, 103, respectively. The apertures 521, 523 of the first mirror 101, and the second mirror 103 are shifted/decentred by the first offset 531, and the second offset 533, respectively. The above-described relations may apply to the first mirror 101 and the third mirror 103 and in general, the values of the first mirror 101 and the third mirror 103 differ.

FIG. 6, further, illustrates a cross-sectional view of the second, convex, mirror 102. The convex mirror 102 may be aspheric or spherical and has a vertex, 502. Further, the system stop may be arranged in the middle on the convex second mirror 102, or near to the convex mirror 102. Thus, a centre 512 of the second aperture 522 may coincide with the optical axis 140o and, hence, the centre or vertex 502 of the second mirror 102, or the centre 512 of the second aperture 522, respectively, may also coincide with the on axis chief ray 140m.

Figure 7:
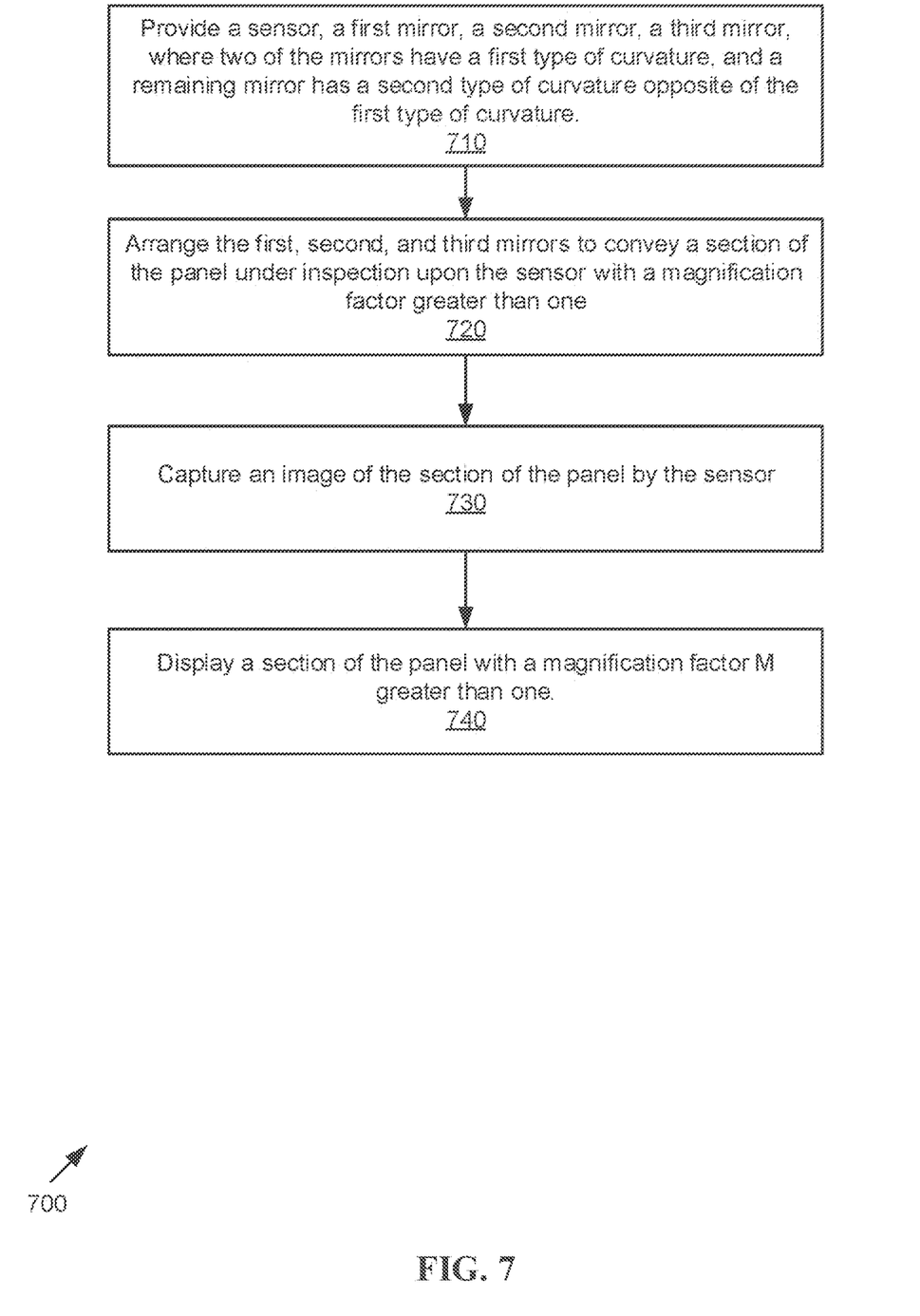
FIG. 7 is a flowchart an exemplary embodiment of a method for inspecting a panel.

FIG. 7 is a flowchart an exemplary embodiment of a method for inspecting a panel. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A sensor 130, a first mirror 101, a second mirror 102, a third mirror 103, are provided, as shown by block 710. At least two of the group of the first mirror 101, the second mirror 102, and the third mirror 103, have both a first type of curvature, and the remaining mirror has a second type of curvature, opposite to the first type of curvature. The first mirror 101, the second mirror 102, and the third mirror 103 are arranged to convey a section 182 of the panel 180 to be inspected on the sensor 130 with a magnification factor M greater than one, as shown by block 720. An image of the section 182 of the panel 180 is captured with the sensor 130, as shown by block 730. The section 182 of the panel 180 on the sensor 130 is displayed with a magnification factor M greater than one, as shown by block 740.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inspection device for inspecting a panel, comprising:
a first mirror, a second mirror, a third mirror, and a sensor, wherein the first mirror, the second mirror, and the third mirror are arranged to display a section of the panel to be inspected on the sensor with a magnification factor M, where M>1, and wherein at least two of the group of the first mirror, the second mirror, and the third mirror, have both a first type of curvature, and a remaining mirror has a second type of curvature, opposite to the first type of curvature,
and the first mirror, the second mirror, and the third mirror form a telecentric system which is telecentric on a panel facing side and/or on a sensor facing side, wherein:
a first vertex of the first mirror, a second vertex of the second mirror, and a third vertex of the third mirror, all lie on a common optical axis;
a first aperture of the first mirror, and a third aperture of the third mirror are decentered relative to the common optical axis; and
a second aperture of the second mirror remains symmetric, and non-decentered about the common optical axis.

2. The inspection device according to claim 1, wherein the first type of curvature is concave, and the second type of curvature is convex.

3. The inspection device according to claim 1, wherein at least one of the group of the first mirror, the second mirror, and the third mirror, is spherical.

4. The inspection device according to claim 1, wherein the first mirror and the third mirror are aspheric and the second mirror is spherical or aspheric.

5. The inspection device according to claim 1, wherein:
the first mirror comprises the first aperture, and the third mirror comprises the third aperture; and
the first mirror and the third mirror are arranged so that:
the first aperture of the first mirror comprises a first offset with the common optical axis, and
the third aperture of the third mirror comprises a third offset with the common optical axis.

6. The inspection device according to claim 1, wherein the second mirror, comprises the second aperture, and wherein a second centre of the second aperture coincides with the common optical axis and a chief ray.

7. The inspection device according to claim 1, wherein;
the first mirror has a focal length $f_1$, the second mirror has a focal length $f_2$, and the third mirror has a focal length $f_3$; and
$|f_1|>|f_2|$, $|f_1|\leq|f_3|$, for $f_1$ of the first mirror, and
$|f_2|<|f_1|$, $|f_2|<|f_3|$, for $f_2$ of the second mirror.

8. The inspection device according to claim 1, wherein the sensor comprises a line sensor.

9. The inspection device according to claim 8, wherein the line sensor has a line sensor length of at least 57 mm.

10. The inspection device according to claim 1, wherein a radius $R_1$ of the first mirror, and a radius $R_3$ of the third mirror are chosen in a ratio of $R_3/R_1$ being equivalent to the magnification factor M.

11. The inspection device according to claim 10, wherein a Seidel aberration of an image of the panel detected by the sensor is reduced according to an arrangement of the first mirror with an object distance D between the panel and the first mirror equal to or on the order of $R_1$.

12. The inspection device according to claim 1, further comprising:

a first planar fold mirror and/or a second planar fold mirror,
wherein the first planar fold mirror is arranged before the first mirror, and wherein the second planar fold mirror is arranged after the third mirror.

13. The inspection device according to claim 1, further comprising:
a camera unit to which the first mirror, the second mirror, and the third mirror are mounted, and further comprises X/Y-stage being adapted to receive the panel,
wherein the X/Y-stage is movable in an X/Y-plane in accordance with a main plane of the panel and relative to the camera unit, so that images of different sections of the panel can be captured depending on a relative position of the X/Y-stage relative to the camera unit.

14. The inspection device of claim 2, wherein the first mirror and the third mirror are of the first type of curvature, the second mirror is of the second type of curvature, the inspection device is arranged so light coming from the section of the panel is reflected towards the first mirror, light from the first mirror the light is reflected to the second mirror, light from the second mirror is reflected towards the third mirror, light from the third mirror is reflected towards the sensor, and an image of the section of the panel is displayed on or reflected towards the sensor so the image of the section is displayed in the sensor with a magnification factor M.

15. A method of inspecting a panel, comprising the steps of:
providing a first mirror, a second mirror, a third mirror, and a sensor, wherein the first mirror, the second mirror, and the third mirror have a combined magnification factor M greater than one and are arranged to convey an image of a section of the panel to be inspected on the sensor, and wherein at least two of the group of the first mirror, the second mirror, and the third mirror, have both a first type of curvature, and the remaining mirror has a second type of curvature, opposite to the first type of curvature;
capturing the image of the section of the panel with the sensor; and
visually displaying the section of the panel on the sensor with a magnification factor M greater than one, wherein:
a first vertex of the first mirror, a second vertex of the second mirror, and a third vertex of the third mirror, all lie on a common optical axis;
a first aperture of the first mirror, and a third aperture of the third mirror are decentered relative to the common optical axis; and
a second aperture of the second mirror remains symmetric, and non-decentered about the common optical axis.

16. The method of claim 15, wherein the panel comprises a display or a printed circuit board.

* * * * *